United States Patent [19]
Kasai et al.

[11] Patent Number: 5,927,878
[45] Date of Patent: *Jul. 27, 1999

[54] MODULAR INFORMATION PROCESSING APPARATUS

[75] Inventors: Kazuaki Kasai; Ikuo Ito; Yoshiki Kinoshita, all of Suwa, Japan

[73] Assignee: Seiko Epson Corporation, Tokyo, Japan

[ * ] Notice: This patent is subject to a terminal disclaimer.

[21] Appl. No.: 08/984,456

[22] Filed: Dec. 3, 1997

Related U.S. Application Data

[63] Continuation of application No. 08/549,362, Oct. 27, 1995, Pat. No. 5,707,162, which is a continuation-in-part of application No. 08/344,242, Nov. 23, 1994, Pat. No. 5,594,920.

[30] Foreign Application Priority Data

Nov. 24, 1993 [JP] Japan ................................ 5-293556
Oct. 27, 1994 [JP] Japan ................................ 6-264016

[51] Int. Cl.⁶ .............................. B41J 3/00; B41J 29/02
[52] U.S. Cl. ........................................ 400/691; 400/694
[58] Field of Search ................................ 400/691, 692, 400/693, 693.1, 694; 312/208.1, 208.2, 208.3, 291, 292, 308

[56] References Cited

U.S. PATENT DOCUMENTS

| | | |
|---|---|---|
| 3,899,775 | 8/1975 | Larsen . |
| 4,398,250 | 8/1983 | Hosono . |
| 4,408,292 | 10/1983 | Nakatani et al. . |
| 4,508,462 | 4/1985 | Haruhara . |
| 4,524,426 | 6/1985 | Eckert et al. . |
| 4,620,808 | 11/1986 | Kurtin et al. . |
| 4,649,481 | 3/1987 | Takahashi . |
| 4,758,714 | 7/1988 | Carlson et al. . |
| 4,760,492 | 7/1988 | Walsh . |
| 4,788,658 | 11/1988 | Hanebuth . |
| 4,837,590 | 6/1989 | Sprague . |
| 4,841,412 | 6/1989 | Heys, Jr. et al. . |
| 4,841,442 | 6/1989 | Hosoyama . |
| 5,035,413 | 7/1991 | Yamada .................. 400/605 |
| 5,053,607 | 10/1991 | Carlson et al. . |
| 5,186,557 | 2/1993 | Fushimi . |
| 5,214,574 | 5/1993 | Chang . |
| 5,214,750 | 5/1993 | Minowa et al. . |
| 5,233,167 | 8/1993 | Markman et al. . |
| 5,253,163 | 10/1993 | Yoshida . |
| 5,253,345 | 10/1993 | Fernandes et al. . |
| 5,311,397 | 5/1994 | Harshberger et al. . |
| 5,344,248 | 9/1994 | Schoon et al. . |
| 5,398,305 | 3/1995 | Yawata et al. . |
| 5,412,761 | 5/1995 | Teradaira . |
| 5,437,004 | 7/1995 | Miyasaka et al. . |
| 5,489,773 | 2/1996 | Kumar . |
| 5,555,489 | 9/1996 | Keskinen . |
| 5,561,282 | 10/1996 | Price et al. . |
| 5,707,162 | 1/1998 | Kasai et al. ............... 400/692 |

FOREIGN PATENT DOCUMENTS

| | | |
|---|---|---|
| A-0 400 653 | 12/1990 | European Pat. Off. . |
| 0 654 767 | 5/1995 | European Pat. Off. . |
| A-2 065 350 | 6/1981 | United Kingdom . |

Primary Examiner—John Hilten
Attorney, Agent, or Firm—Michael T. Gabrik

[57] ABSTRACT

A modular, multi-function information processing device suitable for point-of-sale (POS) station arrangements wherein separate printer and controller components are individually housed and arranged in a stacked vertical configuration. This arrangement save space by minimizing the overall footprint of the station. The connection between these components can be easily established or terminated for performing maintenance on a particular component or subassembly. Subassemblies within the housing may be extracted without impacting the overall structure of the device or use of the other components, and additional components can be easily added. Additionally, the reliability of the apparatus and constituent components and subassemblies is further improved through the implementation of electrostatic countermeasures, including component to component grounding and automatic grounding of the entire apparatus when users insert a key into a central locking mechanism electrically connected to a common electronic and physical reference.

12 Claims, 12 Drawing Sheets

MODULAR INFORMATION PROCESSING APPARATUS

RELATED APPLICATIONS

This is a Continuation of prior application Ser. No. 08/549,362 filed on Oct. 27, 1995, now U.S. Pat. No. 5,707,162, which is a continuation-in-part of Ser. No.08/344,242 filed Nov. 23, 1994 which issued on Jan. 14, 1994 as U.S. Pat. No. 5,594,920, the contents of which are incorporated herein by reference.

BACKGROUND OF THE INVENTION

1. Field of the Invention

The present invention generally relates to an information processing apparatus that integrates a personal computer (PC) and a printer, and more particularly, to a modular information processing apparatus for suitable for point-of-sale operations.

2. Description of the Related Art

Point-of-sale ("POS") stations, or "smart" cash registers, typically installed on the accounting counter of a supermarket or a department store include a drawer for cash management, a printer for printing receipts, a running total display, a keyboard or keypad for user entry, and a managing PC or controller. More recently, POS stations have been enhanced by the addition of an increasing number of satellite sales transaction devices, such as automated teller machine ("ATM") debit or credit card readers, bar code readers for scanning the bar codes on sales or inventory tags, MICR readers for reading the magnetic ink characters printed on personal checks, and security tag removers. Consequently, the installation of a POS station has come to occupy an ever larger space con the sales counter, and has encroached upon the cashier's workspace. Furthermore, the increasing numbers of satellite and complementary sales devices installed around the operator increase confusion, clutter the workspace, and tend to lower operator efficiency despite the benefits they potentially confer. Space is also required for cables to connect these many devices, and the routing of these cables is cumbersome, and therefore makes POS system maintenance and device replacement a difficult and costly task.

To minimize space requirements, some all-in-one type POS stations have been introduced which attempt to integrate at least some of the above-mentioned satellite sales devices into a single unit. However, placing multiple devices into a single housing makes their servicing more difficult and enhances possible downtime risks. For example, a conventional multi-function POS terminal stops working even if only the printer component jams or becomes otherwise inoperable. Also, this sort of POS terminal becomes entirely unusable during the repair of a faulty subassembly.

Further, if a need arises to add or upgrade functionality or features, such as data communications, that were not considered during the initial design, the entire multi-function POS terminal must typically be replaced. This would require a huge expense in most cases since all the POS stations within a single store location must generally possess identical specifications, capabilities and a common user interface.

SUMMARY OF THE INVENTION

It is, therefore, an object of the present invention to reduce the space requirement of a POS station or terminal by integrating into a small space, the PC and the printer components of a POS station.

It is an additional object of the present invention to provide an information processing apparatus for which work stoppage can be minimized even when a device failure occurs, by shortening the time required for device replacement.

It is a further object of the present invention to provide an information processing apparatus that can flexibly and quickly accommodate the addition or enhancement of new functions.

It is also an object of the present invention to provide an information processing apparatus that maintains a high level of reliability despite its compact size, and in which various safety measures have been implemented in order to prevent failures or recording errors.

To achieve these and related objects, the present invention involves modularization of the multi-function POS units. More particularly, the information processing apparatus of the present invention includes a first housing which houses a printer device, a second housing which houses an information processing device, managing controller or personal computer (hereinafter collectively referred to as "PC"). The second housing possesses a footprint approximately identical to that of the first housing. Also, a connector which detachably connects the first and second housings vertically is sandwiched therebetween.

Further, the PC is placed within a removable casing attachable to the second housing. Preferably, the case can slide in and out of the second housing horizontally so as not to disturb the first housing or components contained therein. Of course, an interconnection structure is included within the second housing to receive and connect the encased PC to the other components of the POS terminal.

By housing the printer device and the managing controller or PC device in respective top and bottom housings, both the printer and the PC need only occupy the space occupied by the larger of the two. This arrangement also allows separate maintenance and replacement of the printer device and the PC device. Further, since the case that houses the PC device can removably engage the second housing in the horizontal direction, maintenance and functional enhancements of the PC device can be made without removing the housing that stores the printer device. Consequently, there is no need to remove the top housing, or to move other devices comprising the POS station to access the PC.

Further, the information processing apparatus of the present invention preferably comprises a grounding device which electrically connects the PC casing to the printer device. In this embodiment, the PC case is made of a conductive material and is grounded to the reference electric potential used by the PC device. As such, it would be more desirable to configure the grounding device such that it can elastically change its shape according to the spacing between the case and the printer device. Furthermore, it would be more desirable to install the grounding device such that conductivity can be obtained and maintained on a plane parallel to the moving direction of the case and/or the case of the printer device. When installed in this way, the grounding device slides along the opposing printer device and/or the case when the case is being mounted in the second housing; after the case is mounted in the second housing, the grounding device contacts the opposing printer device and/or the case in a conductive manner.

According to the above configuration, when the PC case is mounted onto the second housing while the top and bottom housings are connected, the grounding device electrically connects the printer device to the case, thus suppressing electrostatic noise, etc. Furthermore, the case can be inserted even if an oil film or dust is present because the grounding device is equipped to slide during the insertion of the case. Therefore, the printer device is securely grounded to the PC case and share a common ground which improves the reliability of the apparatus.

Additionally, because the preferred grounding device possesses elasticity, it can lessen the load during the sliding motion, enabling smooth insertion or extraction of the case. Furthermore, even if the gap between the printer device and the case changes due to play in the installation position, the grounding device elastically alters its shape to absorb the changes, thus achieving secure conduction.

Furthermore, the preferred grounding device can comprise a roughly M-shaped metal plate, with one of its legs used for attaching the grounding device to the PC case and/or the printer device, the other leg becoming a free end which makes sliding contact with this case and/or printer device, and the top area becoming a contact portion for contacting the opposing printer device and/or the PC case. In this configuration, it is acceptable to install semi-spherical protrusions in the contact portion. Accordingly, if the grounding device is subjected to a compressive force, it will be deformed with the free end of the M shape making sliding movements with respect to the fixed end and opposing surfaces. Consequently, the sliding resistance to the moving free end has the effect of increasing the deformation load, i.e., the contact load applied to the contact portion.

Note here that, if the free end does not abut either the printer or PC case (i.e. no force is applied to the free end when load is applied to the contact portion of the M shaped member), the M shaped member acts as a cantilever easily deformed when force is applied at a point away from the attached end. On the other hand, if the free end is instead fixed to the PC case or printer device surface receiving attached end to form a truss, it is hard to deform the M shaped member by applying force at the contact portion, and impedes removal of the PC case. Therefore, in order to increase force required to deform the M shaped member compared to a pure cantilever structure yet still accommodate sufficient deformation characteristics necessary for component modularization, the free end preferably slidably and frictionally engages the opposing surface.

Furthermore, if semi-spherical protrusions are provided in apexes of the M shaped grounding member, the contact portion can be reduced, thus increasing the contact pressure on the contact portion. This increased pressure removes the oil and oxidation films on the contact surface, resulting in excellent and reliable contact when slidable, frictional engagement is employed.

Additionally, an interface connector for connecting an external device can be preferably installed on the back side of the PC case. In this arrangement, preferably a space for housing both the interface connector and a connector to be connected to the interface connector is provided on the back of the PC case inside the second housing when the case is mounted therein. In such a configuration, because the connector on the interface cable side is housed inside the second housing, it is protected from the environment and no positional limitations are experienced when installing the information processing apparatus close to a wall.

Furthermore, the second housing can be provided with an operation lid which is equipped with a key-activated locking mechanism, and with a housing panel which is installed in the front of the case in the insertion direction. This panel preferably supports the operation lid such that the lid can be opened away from the second housing. The locking mechanism is provided with an operation section. When locked, the operation section engages with the case, preventing the extraction of the case and the opening of the operation lid. When unlocked, the operation section disengages from the case, allowing the extraction of the case and the opening of the operation lid. Therefore, this feature permits both the fastening of the case to the second housing and the prevention of the opening of the operation lid using a single locking mechanism.

Additionally, if a conductive material is used for the operation section, the key, the operation section, and the case become electrically connected with each other when the key is inserted in the locked state. By using such a locking mechanism, when an operator needs to perform maintenance operations by extracting the case, the operator and the case reach the same electrical potential, thus preventing electrostatic damage to components and the destruction of memory content.

Other objects and attainments together with a fuller understanding of the invention will become apparent and appreciated by referring to the following description and claims taken in conjunction with the accompanying drawings.

BRIEF DESCRIPTION OF THE DRAWINGS

A better understanding of the present invention may be had in reference to following preferred embodiments when considered in conjunction with the following drawings, in which.

DESCRIPTION OF THE PREFERRED EMBODIMENTS

Figure 1:
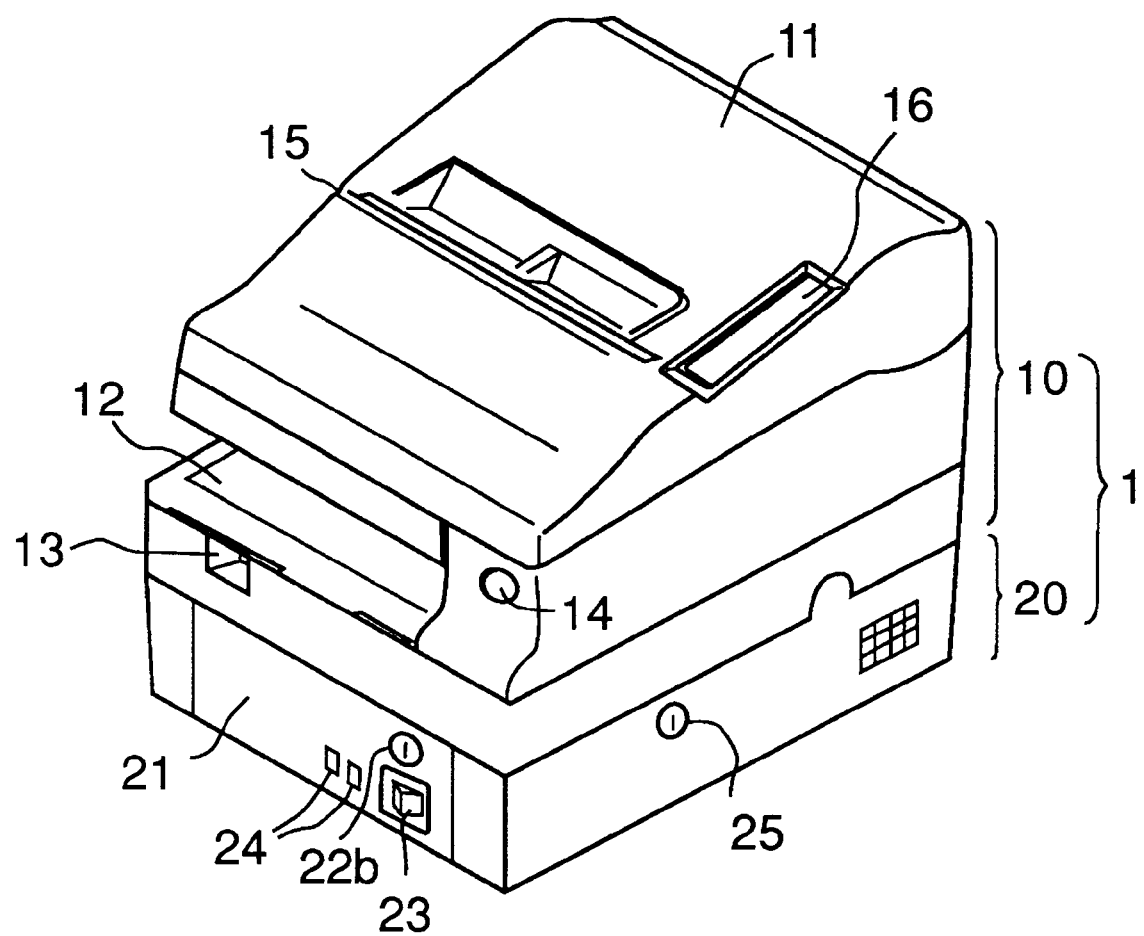
FIG. 1 is a front perspective view of the modular information processing apparatus according to the first preferred embodiment.
Figure 2:
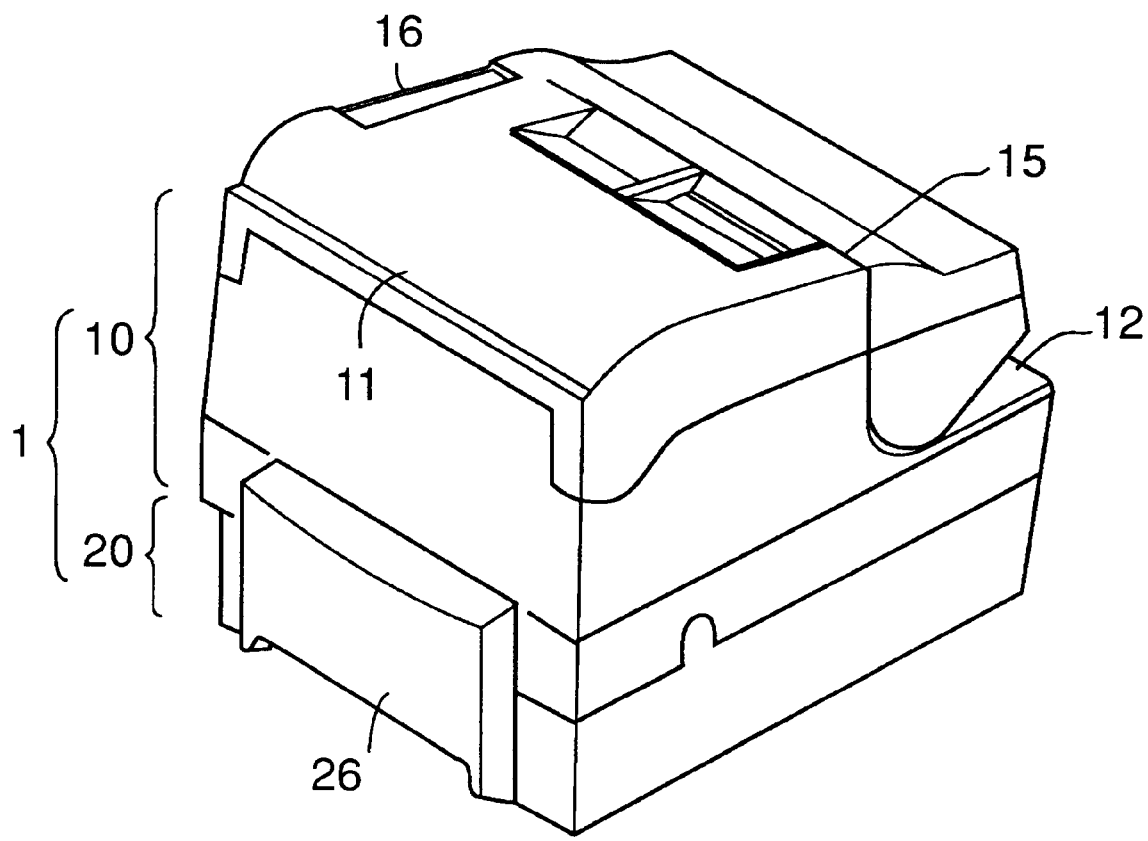
FIG. 2 is a rear perspective view of the modular information processing apparatus according to the embodiment shown in FIG. 1.

FIG. 1 shows information processing apparatus 1 of the first preferred embodiment of the present invention, viewed perspectively from the front (the direction of arrow 2), and FIG. 2 shows the corresponding rear view thereof (viewed from the direction of arrow 3). Information processing apparatus 1 in the present embodiment is approximately rectangular in shape with its depth slightly longer than its width, and comprises top housing 10 which stores a printer device and bottom housing 20 which houses a personal computer (PC) device. The printer device housed in top housing 10 comprises functions which print journals and receipts on the two rolls of paper housed in rear housing area 11, and a function which prints information on single slips inserted through insertion opening 12 located in the front area of the housing. Printer power switch 13 and mode selection switch 14 are provided in the front area of top housing 10, enabling the operation of these switches from the front of the apparatus. Furthermore, discharge opening 15 for discharging rolled paper and individual slips, as well as display device 16 which indicates the operating status of the apparatus, are located on the upper area of top housing 10, enabling the operation of these devices from the top of the apparatus.

Bottom housing 20 which houses the PC device is preferably located below top housing 10 which houses the printer device. In other words, because top housing 10 and bottom housing 20 are designed to possess similar footprints, the entire information processing apparatus 1 in the present embodiment can be installed in a work area large enough to accommodate the top housing 10. Furthermore, top housing 10 and bottom housing 20 are designed to appear as a single unit when combined, and this combination can be treated as a single unit for storage and transportation purposes. Naturally, according to the objects of the present invention, the bottom shape of bottom housing 20 need not be identical to that of top housing 10, and can be smaller than the bottom shape of top housing 10 as long as the external appearance of the apparatus is not adversely affected.

Front lid 21 which opens outward is installed in the front of bottom housing 20. This front lid 21 is provided with a locking mechanism which is operated by inserting a metal key in key hole 22. Through front lid 21, power switch 23 of the PC can be operated and the operating status of the PC can be checked using front lid lamp 24.

Key hole 25 for operating the locking mechanism which connects top housing 10 to bottom housing 20, is installed on the right side (arrow 6 side) of bottom housing 20. Furthermore, back cover 26 is installed on the back side of bottom housing 20, and the connector cables which connect information processing apparatus 1 in the present embodiment to other apparatuses can be housed inside the back cover 26. Back cover 26 is detachably installed in bottom housing 20, and thus can be removed during the installation or removal of the cables.

Figure 3:
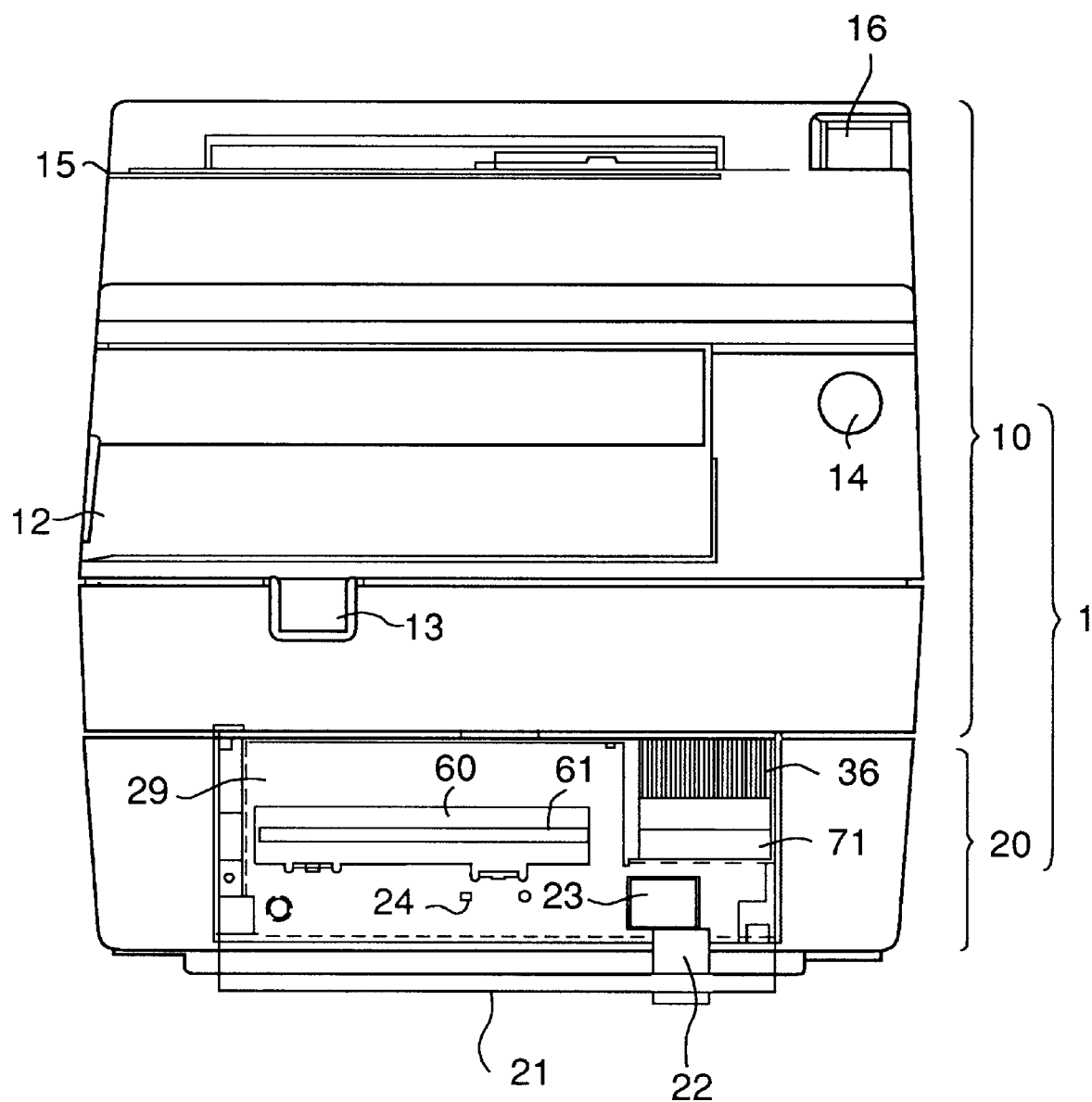
FIG. 3 is a front elevation view off the modular information processing apparatus according to the embodiment shown in FIG. 1.

FIG. 3 shows the exterior of information processing apparatus 1 of the present embodiment viewed from the front. As shown in the figure, when front lid 21 is opened by releasing the lock of locking mechanism 22, front panel 29 appears which is linked to bottom housing 20. A medium can be inserted in or removed from slot 61 of floppy disk unit 60 through front panel 29.

Figure 6:
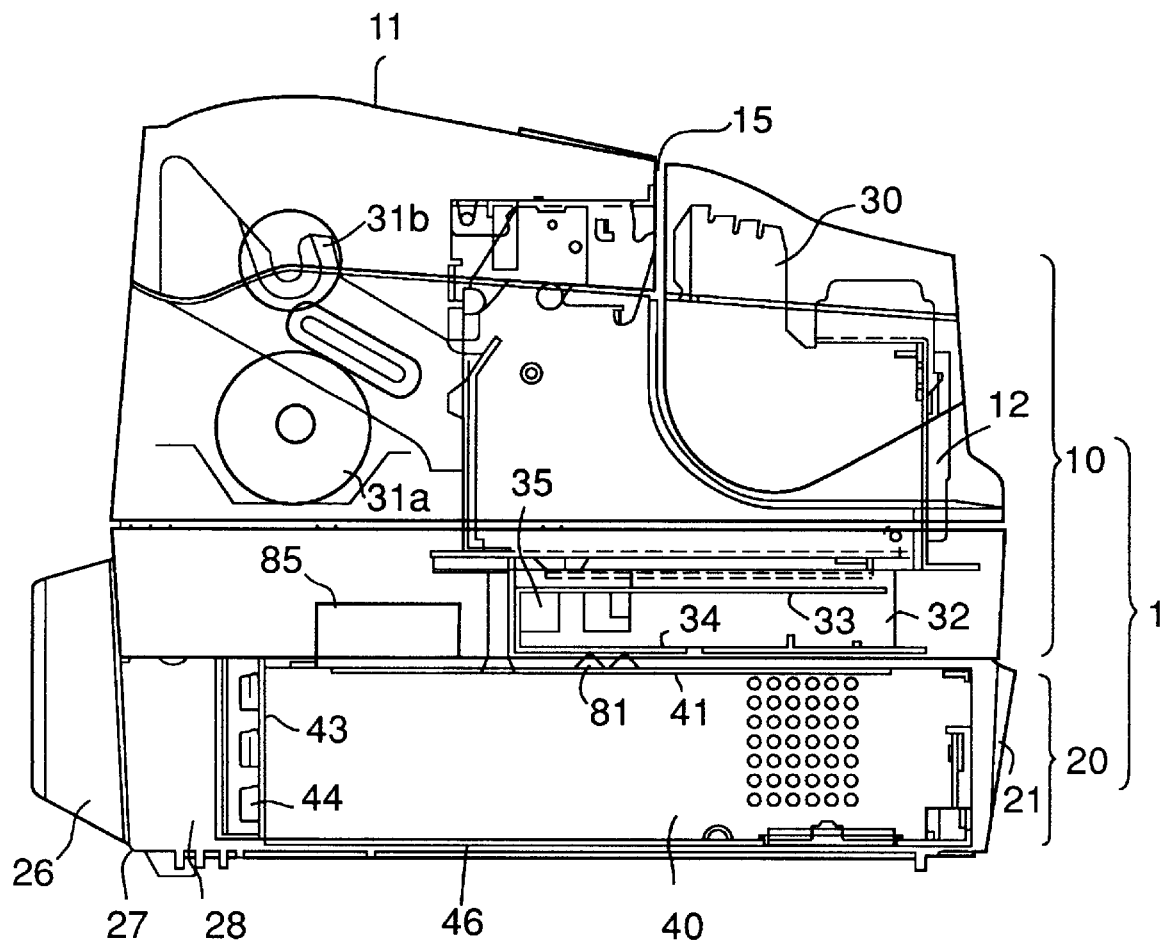
FIG. 6 is side view of the modular information processing apparatus according to the embodiment shown in FIG. 1 illustrating the internal components mounted therein.

FIG. 6 shows the major internal components located on the left side of information processing apparatus 1 according to the first preferred embodiment. Printer mechanism 30 which includes a motor and a print head is contained in the front of top housing 10, rolled paper installation area 31a is located in back area 11 of this housing, and take-up mechanism 31b is located on top and takes up printed paper. Control module 32 which contains electronic components for controlling each mechanism is installed below printer mechanism 30. Control module 32 contains components such as control board 33 affixed therein. When case 40 which houses the PC module is removed in the manner to be explained below, control module 32 can be checked or repaired, or components can be replaced from the bottom side of top housing 10, after simply extracting metallic bottom cover 34 installed on the bottom of the control module 32. Control module 32, including bottom cover 34, is made of metal sheets, thus reducing EMF interference and noise radiation. The printer mechanism is electrically grounded to control module 32.

Connectors 35 are preferably provided in the back of control module 32, and are used for connecting the printer device to other devices when the printer device is disconnected from the PC device in the present embodiment and used separately. Note that these connectors 35 are not used when the printer device is connected to the PC device in the present embodiment, and that control module 32 is connected to the PC via a dedicated connector cable.

Case 40 which houses the PC module is housed inside bottom housing 20. The case 40 which forms an approximate rectangular parallelepiped is preferably made of metal plates, and metallic contact plates 81 are installed on top of top cover 41 of case 40. The contact plates 81 contact bottom cover 34 of control module 32 which is housed inside top housing 10, such that control module 32 and the printer mechanism connected to the same are grounded to case 40. This grounding prevents electrostatic problems and events from occurring in the printer device housed inside top housing 10.

Expansion input-output unit 85 is preferably placed on the back area of cover 41 of case 40. Because this free area is located behind the above-mentioned connector 35 of the printer, expansion unit 85 can be installed without any interference from other components. Connector group 44 is positioned on back surface 43 of case 40, which is used for connecting the PC to devices other than the printer device housed inside top housing 10. Because the depth of case 40 is shallower than that of bottom housing 20, connector group 44 is positioned well within housing 20 as measured from its back edge 27. This arrangement creates space 28 which can house connection cables and their plugs. In information processing apparatus 1 of the present embodiment, additional back cover 26 is provided in the back of bottom housing 20, to create space 28 for housing cables. Therefore, cables and plugs are protected even if information processing apparatus 1 is installed tightly against a back wall or another device. Cables can be connected to expansion input-output unit 85 through the space 28.

Figure 4:
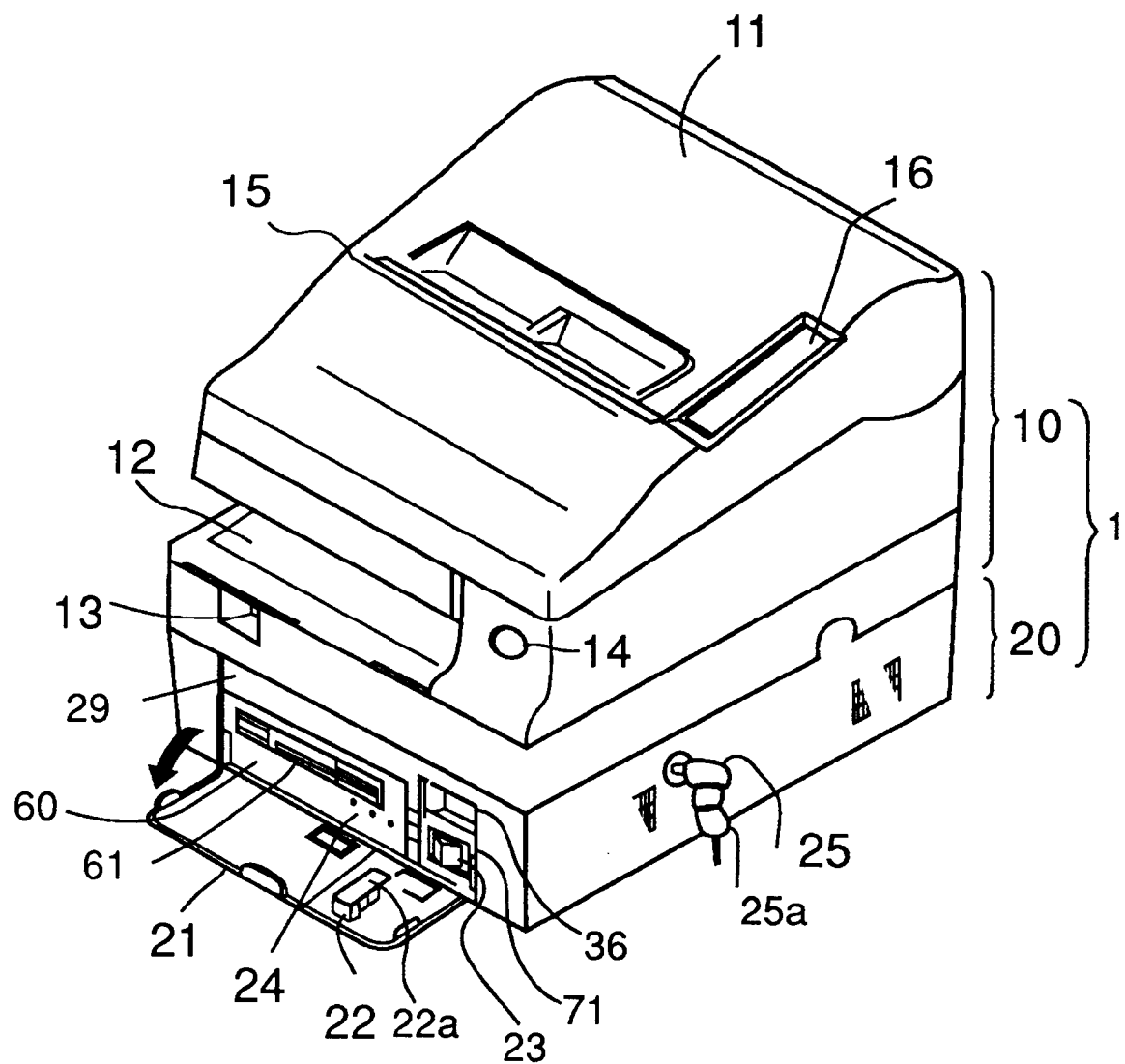
FIG. 4 is a front perspective of the modular information processing apparatus according to the embodiment shown in FIG. 1 illustrating the state in which the key lock is released.
Figure 5:
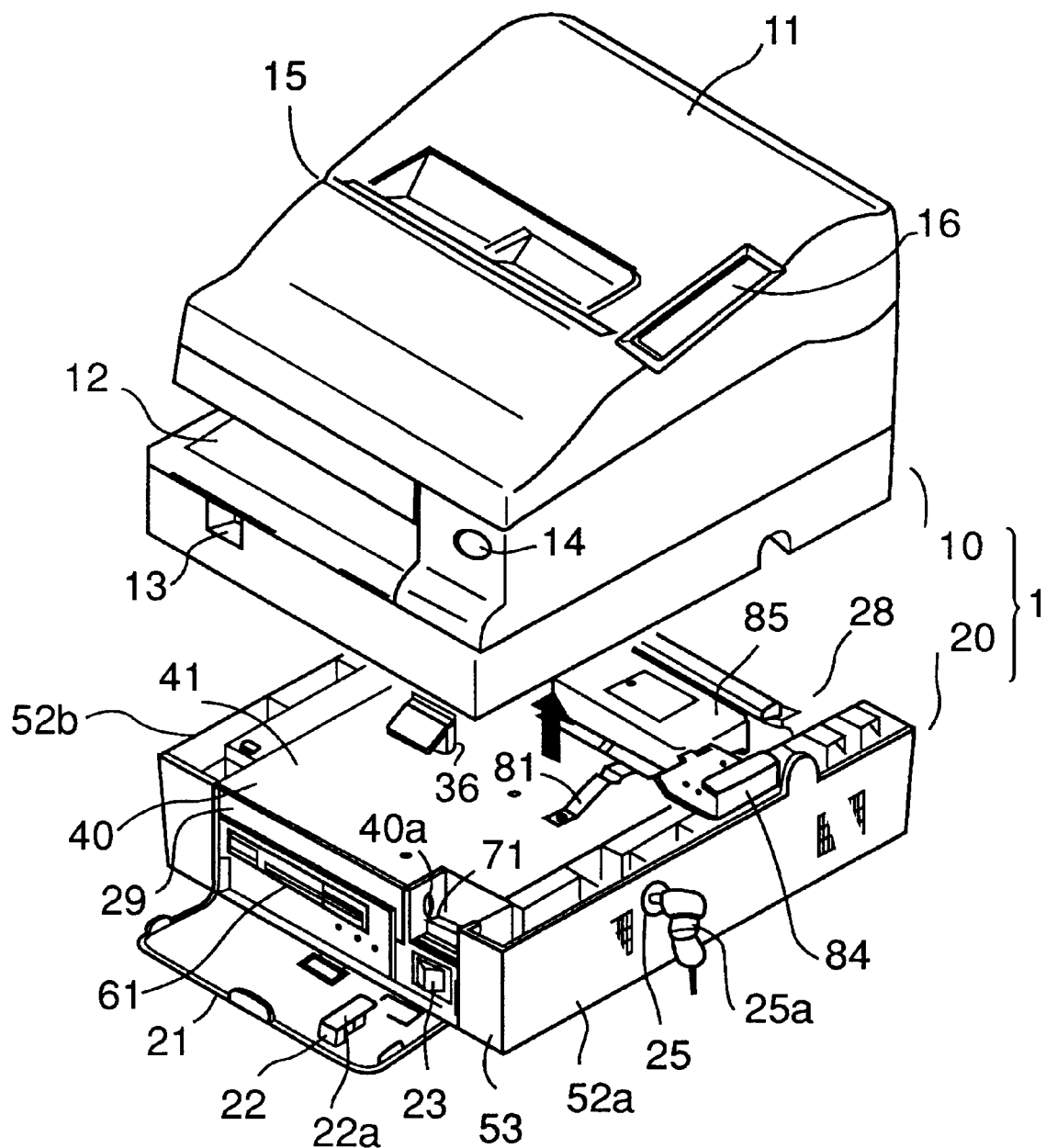
FIG. 5 is a partially exploded perspective view of the modular information processing apparatus according to the embodiment shown in FIG. 1.

FIG. 4 and FIG. 5 show the method of separating top housing 10 from bottom housing 20. First, after back cover 26 is removed, locking mechanism 22 of front lid 21 is released to open front lid 21. Cable 36 which connects the printer device to the PC device is then removed from connector 71. Next, key 25a is used to release locking mechanism 25 provided on the right side of bottom housing 20. Then, by moving top housing 10 and bottom housing 20 slightly sideways to release hook 84 which was fastening housings 10 to 20, top housing 10 can be disengaged from bottom housing 20. Naturally, the above procedure is reversed when installing top housing 10 onto bottom housing 20.

Figure 7:
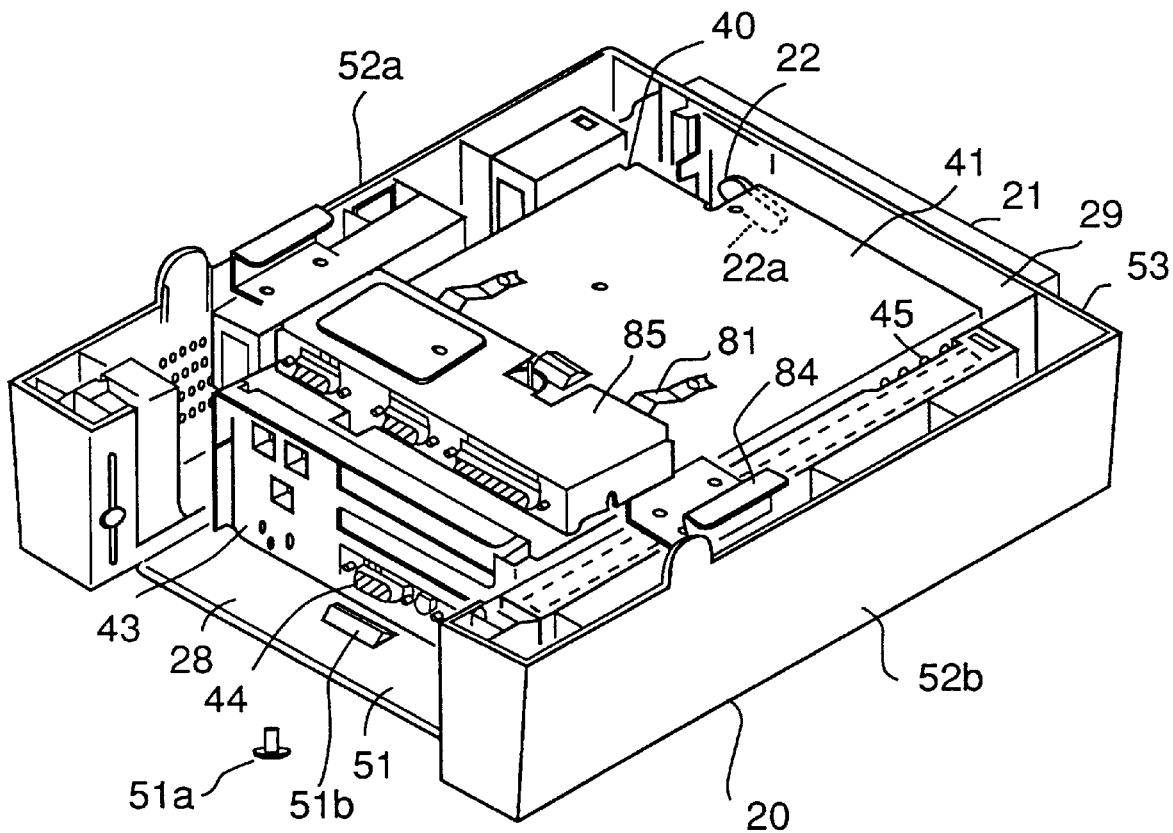
FIG. 7 is a front perspective view of the bottom housing and PC case mounted therein of modular information processing apparatus according to the embodiment shown in FIG. 1.

FIG. 7 shows the preferred state in which case 40 is housed inside bottom housing 20. In the present embodiment, bottom housing 20 is made of molded plastic like top housing 10; and when the two housings are combined, nearly the entire exterior of apparatus 1 of the present embodiment will be covered by molded plastic components. Bottom housing 20 comprises bottom area 51 which is substantially rectangular, right and left side walls 52a and 52b which rise up from both sides of the bottom area 51, and front wall 53 which spans and connects the respective side walls 52a and 52b. The opposing back of side walls 52a and 52b is left open, allowing case 40 to be inserted or extracted through this opening as will be explained hereinbelow. The space behind this opening becomes space 28 which is used for housing cables.

When case 40 is inserted from the back along side walls 52a and 52b until its front face reaches the approximate center of front wall 53, i.e., until the front face contacts front panel 29, the rear edge of case 40 is stopped by the engagement of tab 51b which protrudes from bottom area 51 of tie housing. Note here that front panel 29 is a part of front wall 53 and covered by front lid 21 when front lid 21 is closed. When this operation is completed, front face 60 of the floppy disk unit mounted in case 40 will be covered by front panel 29, as shown in FIG. 5. A floppy disk medium is inserted or removed through this front face 60. Furthermore, front lid 21 equipped with locking mechanism 22 is installed in the front face of front wall 53, such that it can be opened or closed. Locking mechanism 22 which engages front lid 21 in the closed state is installed in front lid 21, such that it can rotate, and comprises metallic arm 22a which extends toward the interior of the apparatus and slit 40a which is installed in case 40 and which engages with the arm 22a. To lock front lid 21, after the lid is closed, arm 22a is rotated and then inserted into and engaged with slit 40a. This locking mechanism 22 simultaneously locks front lid 21 and case 40 via front panel 29.

On the other hand, when it is necessary to inspect or repair the PC or to add or replace an expansion board for functional enhancements, case 40 must be extracted from bottom housing 20. In such a case, a key is used to unlock locking mechanism 22 from the front of front lid 21. Since a metallic key is used for unlocking, the operator and case 40 become electrically connected via the key and locking mechanism 22. This connection allows the electrostatic charge that may have accumulated in the operator's body to be discharged to case 40 before the same operator touches any of the electronic components inside case 40 in performing abovementioned operations, thus preventing possible damage due to electrostatic discharge. Likewise, when a medium is being inserted in or removed from the floppy disk unit, the key is first used to open front lid 21, and thus damage to the medium or stored data due to electrostatic discharge is significantly reduced.

Figure 8:
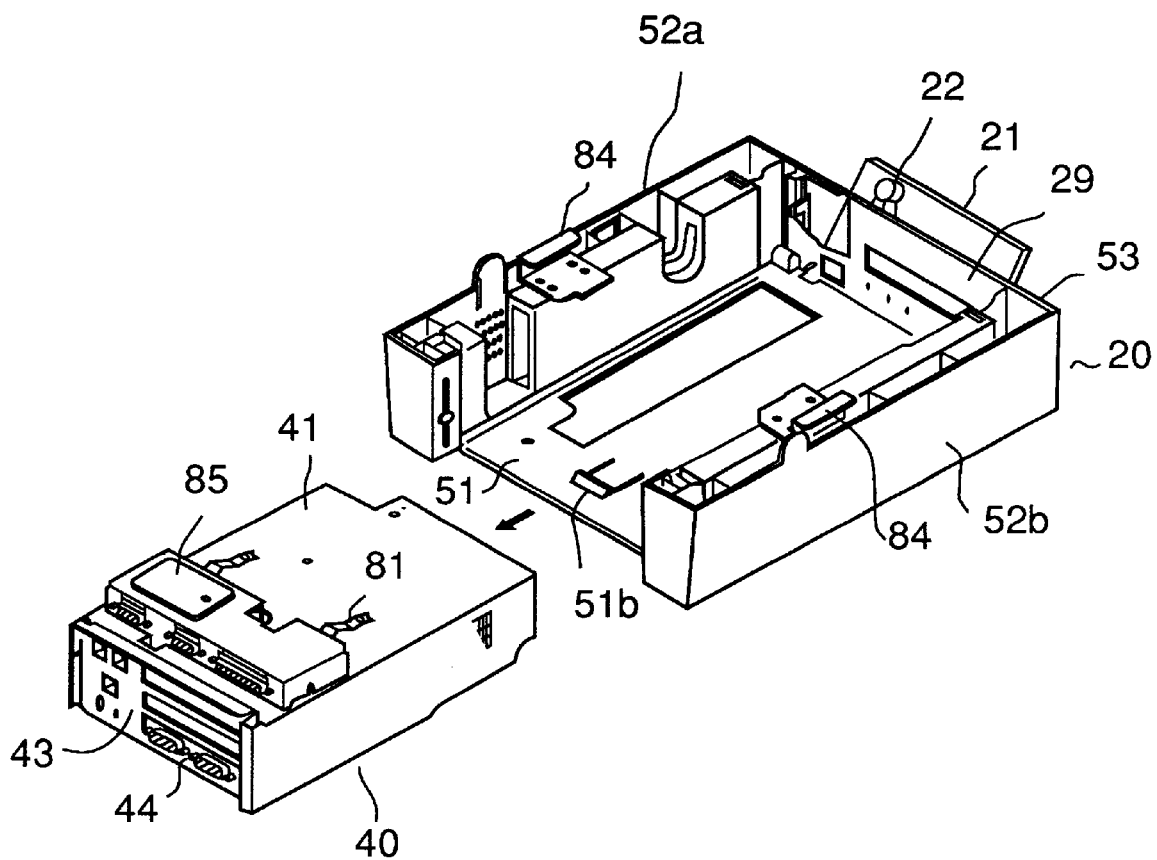
FIG. 8 is a partially exploded perspective view of the bottom housing and PC case illustrated in FIG. 7 depicting extraction of the PC case from the bottom housing.

FIG. 8 shows the extraction of case 40 from bottom housing 20. To extract case 40 from the back of bottom housing 20, remove key lock 22 which fastens front lid 21, as explained above. Remove screw 51a if it has been used to fasten case 40 to housing during shipment as shown in FIG. 7. Then, pull case 40 out toward the back while depressing tab 51b which protrudes from bottom surface 51 of the housing for the purpose of fastening the rear edge of case 40.

Because interface connectors 44 are concentrated and installed in rear surface 43 of case 40 in the present embodiment, cables connected to interface connectors 44 do not interfere with bottom housing 20, posing no obstacle to the extraction of case 40.

Although the figure shows case 40 being extracted after top housing 10 has been removed, case 40 can be extracted while top housing 10 is engaged with bottom housing 20. This is because top housing 10 is supported by side walls 52 of bottom housing 20, which extend approximately parallel to each other and between which case 40 can be housed. As will be explained below, contact plates 81 which connect top cover 41 of case 40 to bottom cover 34 of control module 32 are also shaped so as not to interfere with the extraction of case 40.

Figure 9:
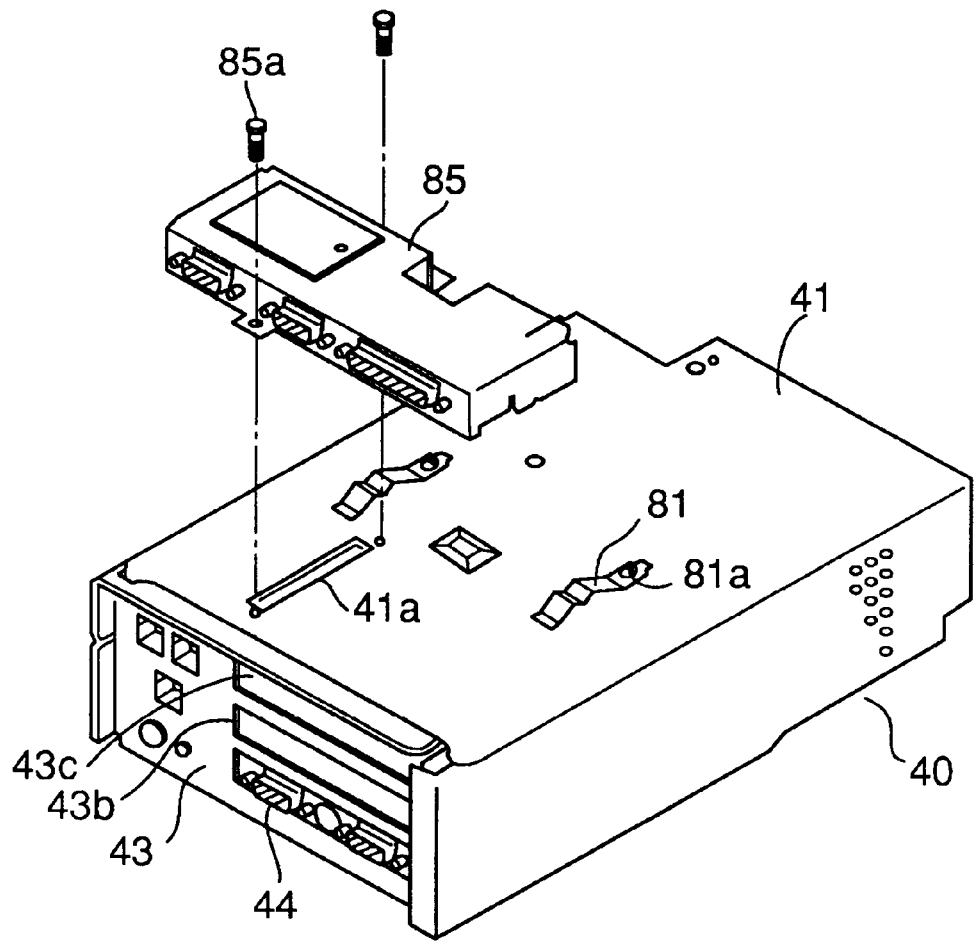
FIG. 9 is a partially exploded perspective view of the PC case and corresponding expansion unit of the modular information processing device according to the embodiment shown in FIG. 1.
Figure 11:
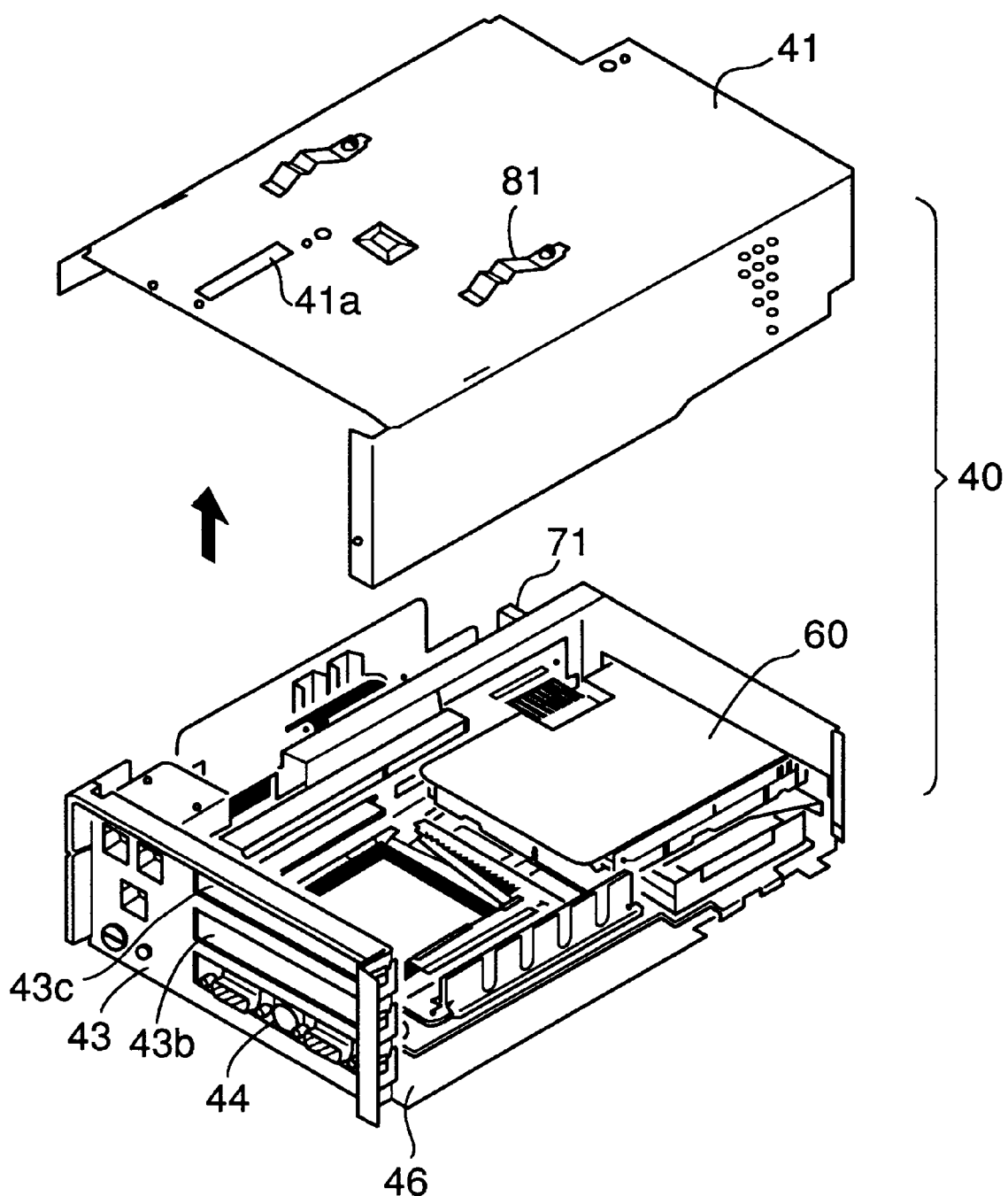
FIG. 11 is a partially exploded perspective view of the PC case according to the embodiment shown in FIG. 1.

FIG. 9 is a front perspective view of case 40 which contains the PC module. As shown in FIG. 11, case 40 comprises top cover 41 which covers the top and the left side, and bottom cover 46 which covers the bottom, front, back, and the right sides. By surrounding the circuit boards which comprise the PC module (not shown), metallic case 40 acts as an RF and EMF noise shield. The case is also grounded to the reference potential of the enclosed circuit boards, and can be used for grounding the printer mechanism as explained above. Rear surface 43 is provided with standard interface connectors 44 which are used for connecting devices such as a display, a keyboard, and a telephone line. By adding expansion boards, it is possible to add an external hard disk or to connect other PCs. For this reason, two expansion slots 43b and 43c are provided to enable connection to the connectors of the expansion boards through case 40.

Connector slot 41a, which is used for connecting expansion input-output unit 85, is exposed through the slit provided in the middle of the rear area of top cover 41. Expansion input-output unit 85 is connected to the PC through the insertion of the connector pins (not shown in the figure) which extend downward from unit 85, into connector slot 41a; and in this state is directly secured to top cover 41 via screw 85a. Expansion input-output unit 85 expands standard interface connectors 44 which are provided in the back, and is used for connecting such additional devices as a page printer and a scanner.

Contact plates 81, which contact control module 32 housed inside top housing 10 and which ground the printer mechanism and control module 32, are installed on two sides of the top surface of case 40 using screws 81a. It is preferable that screws 81a be made of a conductive material.

Figure 10:
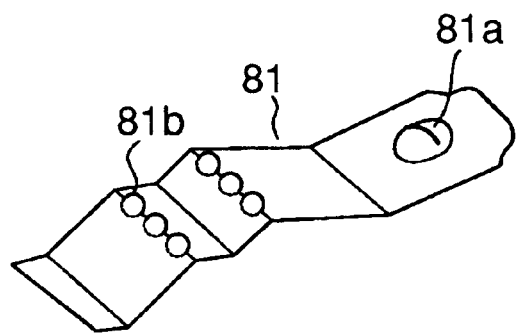
FIG. 10 is an enlarged perspective view of the contact plate shown in FIG. 10 according to the embodiment shown in FIG. 1.

FIG. 10 shows a magnified view of one of contact plates 81. Contact plates 81 in the present embodiment consist of a metal plate that has been bent into an approximate M shape. Semi-spherical protrusions 81b have been formed on the two apexes through drawing, as is known in the art. Because contact plates 81 can elastically deform in response to the size of the gap between top cover 41 of case 40 and bottom cover 34 of control module 32, they can slide along case 40 when case 40 is being inserted or removed in the forward or backward direction below bottom cover 34, and thus do not interfere with the movement of case 40. Contact plates 81 also ensure solid contact with bottom cover 34.

Furthermore, contact plates 81 suffer very little plastic deformation because they contact case 40 at three points, i.e., two edges and the trough area, over which stress is distributed.

To reduce the contact resistance between the contact plate 81 and bottom cover 34, contact pressure must be increased. Even if an oil or oxidation film is present on the contact surface, high contact pressure and sliding motions will be able to eliminate the film, thus ensuring excellent and reliable contact. In the present embodiment, semi-spherical protrusions 81b are forced to slide along bottom cover 34 when contact plate 81 is deformed by the load applied at semi-spherical protrusions 81b. Consequently, the frictional force between semi-spherical protrusions 81b and bottom cover 34 opposes deformation of contact plate 81. This arrangement, in turn, increases the deformation load, i.e., the contact pressure between the contact plate and bottom surface 34 without impeding sliding engagement therebetween. Because semi-spherical protrusions 81b contact bottom cover 34 at each point having very small area, the high contact pressure can be obtained at each contact point. Moreover, a plurality of semi-spherical protrusions 81b ensure the continuity between contact plate 81 and bottom cover 34. For example, if some protrusions are covered with some kind of oxide layer, the continuity is maintained by other protrusions. Further, the total resistance of all the contact points can also be reduced.

Additionally, the use of semi-spherical protrusions 81b prevents the sliding movements from causing excessive wear or gouging in the contact area, and also prevents the generation of troublesome metallic powder which can damage the delicate electromechanical components contained within the housing.

Although semi-spherical protrusions were formed in the contact area of the contact plate in the present embodiment, the present invention is not limited to such a shape, and any shape can be used as long as it possesses a small contact area and shaped to enable smooth sliding movements. For example, cylindrical protrusions that are approximately perpendicular to the sliding direction and that possess axes parallel to bottom cover 34 would produce similar effects.

Figure 12:
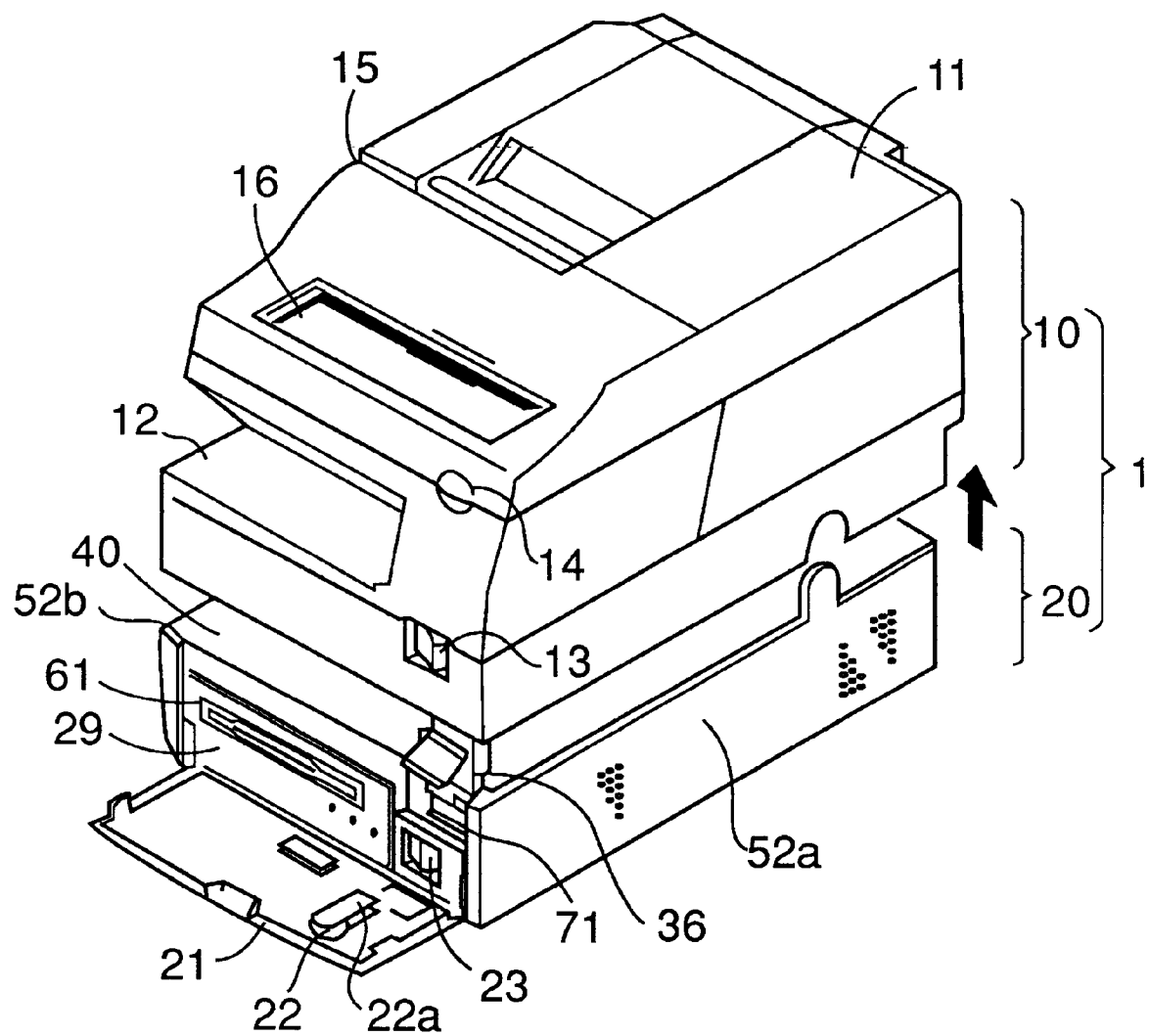
FIG. 12 is a partially exploded perspective view of the modular information processing apparatus according to the second preferred embodiment.

FIG. 12 shows an example of an information processing apparatus according to the second preferred embodiment in which a printer mechanism smaller than that in the previous embodiment is used. This printer mechanism, with one roll of paper mounted, can print journals, receipts, and slips. The width of information processing apparatus 1 in the present embodiment is narrower than that in the previous embodiment because of the smaller printer mechanism.

Figure 13:
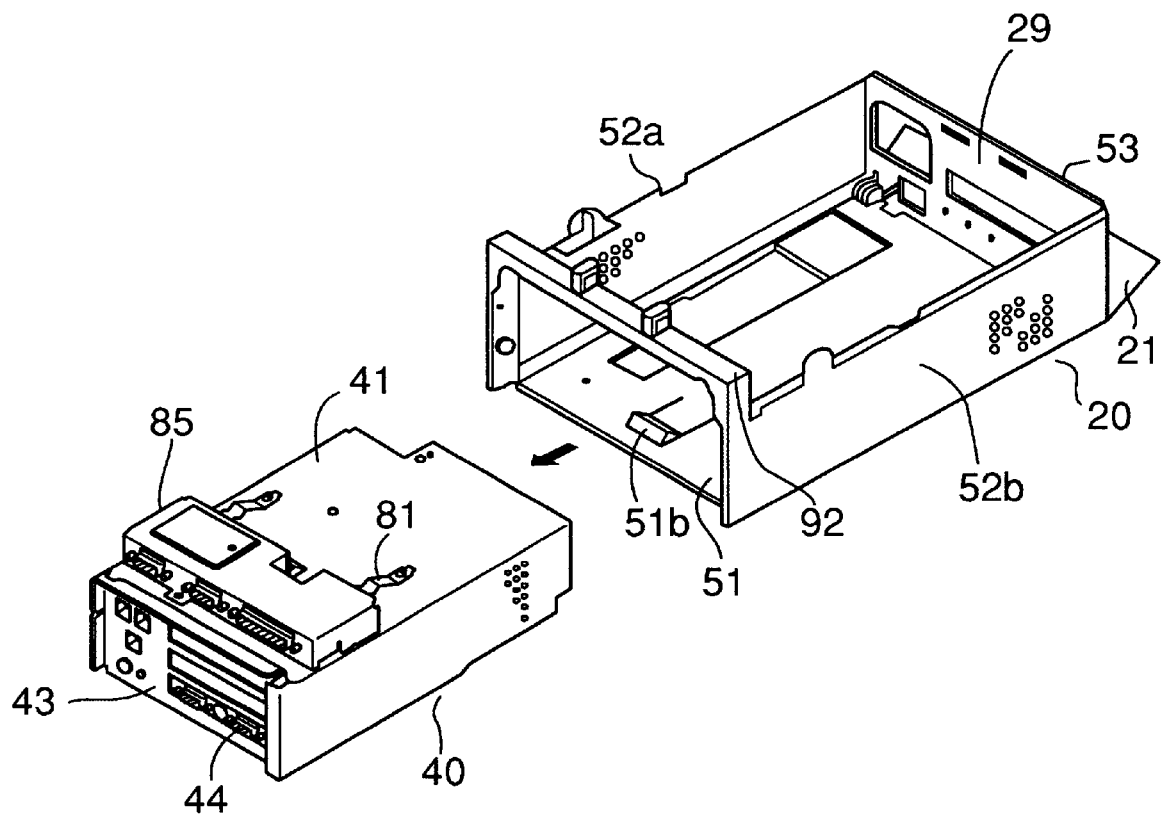
FIG. 13 is a partially exploded perspective view of the bottom housing and PC case illustrated in FIG. 12 depicting extraction of the PC case from the bottom housing.

FIG. 13 shows the extraction of case 40 from bottom housing 20. Here, case 40 is the same as that used in the previous embodiment. In other words, case 40 is designed to match the narrower width so that the PC device and case of the same specifications can be used even when the width of top housing 10 is reduced. In the present embodiment, in order to make the width of case 40 as wide as possible, side walls 52a and 52b of bottom housing 20 are made of a single plastic plate, providing a large space inside the housing. In order to increase the strength of side walls 52a and 52b, a bridge-shaped beam 92 connects these walls.

As explained above, case 40 used in the information processing apparatus in the present embodiment is identical to that used in the previous embodiment, and thus a detailed explanation is omitted. Furthermore, the configurations of the top and bottom housings are nearly identical; like numerals are used to represent like parts. Although the apparatus in the present, embodiment has been made smaller to match the smaller printer, its design concept is the same as that used for the information processing apparatus in the previous embodiment, e.g., case 40 can be extracted toward the back with cables intact. Therefore, as in the previous embodiment, the information processing apparatus in the present embodiment is characterized in that maintenance, parts replacement, and installation of expansion boards can be easily performed.

As explained above, the information processing apparatus of the present invention enables compact integration of the printer and the PC, and thus is ideal in functionally integrating into a small area, a POS station which requires these devices. Furthermore, despite the fact that these devices are integrated into a compact area, individual devices can still be easily removed, realizing the same ease of maintenance as in conventional stand-alone type instruments. Consequently, inspections and repairs can be performed quickly and simply. Additionally, the reliability of the apparatus is further improved through the implementation of an electrostatic countermeasure, etc.

Furthermore, because the information processing apparatus related to the present invention uses a PC module high in general applicability and expandability, functions can be easily selected and added according to the user's needs, and future functional enhancements can be flexibly incorporated. Therefore, the user will be able to quickly and inexpensively implement information processing apparatuses that possess functions ideally suited to the intended application, and furthermore will be able to cope with future business expansions and the connection of peripheral devices, by effectively using the installed devices.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A modular information processing apparatus, comprising:
    a first housing shaped to occupy a first horizontal footprint and house a printer therein, said first housing comprising at least one discharge opening located on an upper area thereof for discharging a recording medium printed by said printer;
    a second housing for housing therein an information processing device for controlling said printer, said second housing being positioned under said first housing and possessing a second horizontal footprint substantially similar to said first footprint so that the second housing can be installed within an area large enough for accommodating said first housing; and
    a connector for detachably connecting said first and second housings in an overlapping vertical operational configuration.

2. A modular information processing apparatus according to claim 1, wherein said second housing houses a floppy disk unit therein and comprises, in a front area thereof, an opening for receiving a floppy disk medium.

3. A modular information processing apparatus according to claim 1, wherein said second housing comprises, in a front area thereof, an opening through which a power switch of the information processing device is operated.

4. A modular information processing apparatus according to claim 1, wherein said second housing comprises, in a front area thereof, at least one opening for exposing a lamp indicating the operating status of the information processing device.

5. A modular information processing apparatus according to claim 1, wherein said first housing comprises, on an upper area thereof, a display device for indicating the operating status of the printer.

6. A modular information processing apparatus according to claim 1, wherein said modular information processing apparatus appears as a single unit when said top and bottom housings are connected in the overlapping vertical operational configuration.

7. A printing apparatus for use with an information processing device detachably connected thereto to form an information processing apparatus, the information processing device being housed by a bottom housing possessing a first horizontal footprint, said printing apparatus comprising:

- a printer for printing on a recording medium, said printer being controlled by the information processing device;
- a top housing for housing said printer therein, said top housing being shaped to occupy a second horizontal footprint substantially similar to the first horizontal footprint so that said top housing can be installed within an area large enough for accommodating the bottom housing, said top housing comprising at least one discharge opening located on an upper area thereof for discharging a recording medium printed by said printer; and
- a connector for detachably connecting said top housing to the bottom housing in an overlapping vertical operational configuration.

8. A printing apparatus according to claim 7, wherein said top housing comprises, on an upper area thereof, a display device for indicating the operating status of said printer.

9. An information processor for use with a printer detachably connected thereto to form a modular information processing apparatus, the printer being housed by a top housing possessing a first horizontal footprint, said information processor comprising:

- a bottom housing for housing therein an information processing device for controlling the printer, said bottom housing being positioned under said top housing and possessing a second horizontal footprint substantially similar to the first footprint so that said bottom housing can be installed within an area large enough for accommodating the top housing; and
- a connector for detachably connecting said bottom housing to the top housing in an overlapping vertical operational configuration.

10. An information processor according to claim 9, wherein said bottom housing houses a floppy disk unit therein and comprises, in a front area thereof, an opening for receiving a floppy disk medium.

11. An information processor according to claim 9, wherein said bottom housing comprises, in a front area thereof, an opening through which a power switch of the information processing device is operated.

12. An information processor according to claim 9, wherein said bottom housing comprises, in a front area thereof, at least one opening for exposing a lamp indicating the operating status of the information processing device.

* * * * *